(12) United States Patent
McCalla

(10) Patent No.: US 6,422,369 B1
(45) Date of Patent: Jul. 23, 2002

(54) VEHICLE WHEEL END CLUTCH

(75) Inventor: John M. McCalla, Ferndale, MI (US)

(73) Assignee: Warn Industries, Inc., Milwaukie, OR (US)

( * ) Notice: Subject to any disclaimer, the term of this patent is extended or adjusted under 35 U.S.C. 154(b) by 0 days.

(21) Appl. No.: 09/676,291

(22) Filed: Sep. 28, 2000

(51) Int. Cl.⁷ .......................... B60B 27/00; B60K 23/08
(52) U.S. Cl. ................. 192/69.41; 180/247; 192/69.91; 192/85 V; 192/88 A; 301/105.1
(58) Field of Search .................. 192/69.41, 69.91, 192/88 A, 85 V; 180/247; 301/105.1

(56) References Cited

U.S. PATENT DOCUMENTS

| 4,293,061 A | * | 10/1981 | Brown | 192/69.41 |
|---|---|---|---|---|
| 4,817,752 A | | 4/1989 | Lobo | |
| 4,893,960 A | | 1/1990 | Beier | |
| 4,960,192 A | * | 10/1990 | Kurihara | 192/69.41 |
| 5,148,901 A | * | 9/1992 | Kurihara et al. | 192/69.41 |
| 5,219,054 A | * | 6/1993 | Teraoka | 192/69.41 |
| 5,353,890 A | * | 10/1994 | Clohessy | 180/247 |
| 5,586,632 A | * | 12/1996 | Bigley et al. | 192/69.41 |
| 5,702,162 A | * | 12/1997 | Pressler | 301/105.1 |
| 5,740,895 A | | 4/1998 | Bigley | |
| 5,806,623 A | * | 9/1998 | Clohessy | 180/247 |
| 5,908,080 A | * | 6/1999 | Bigley et al. | 180/247 |
| 5,984,422 A | | 11/1999 | Seifert | |
| 6,109,411 A | | 8/2000 | Bigley | |
| 6,234,289 B1 | * | 5/2001 | Baker et al. | 192/69.41 |

* cited by examiner

Primary Examiner—Rodney H. Bonck
(74) Attorney, Agent, or Firm—Robert L. Harrington

(57) ABSTRACT

This invention is directed to a wheel end assembly for engaging and disengaging the wheel end of a vehicle that is convertible between four-wheel and two-wheel drive. The invention is further directed to clutch ring engagement at the inboard end of a wheel hub whereat a retention feature retains the support bearings for the wheel hub on the vehicle suspension and whereat, independent of the retention feature, the clutch ring is operable directly between the wheel hub and axle.

7 Claims, 3 Drawing Sheets

VEHICLE WHEEL END CLUTCH

FIELD OF THE INVENTION

This invention relates to the conversion of a vehicle wheel from passive to driven drive as when converting a vehicle between two-wheel and four-wheel, and more particularly it relates to the manner of providing selective clutch ring engagement as between a vehicle's axle and a wheel hub for achieving the conversion.

BACKGROUND OF THE INVENTION

A common arrangement for a two-wheel/four-wheel drive vehicle is with the two rear wheels in permanent drive and the front wheels convertible as between passive where the drive train is disconnected from the front wheels (the front wheels passively roll on a roadway as the vehicle is driven by the rear wheels), and driven where the front propellor shaft and front axles are connected to the front wheels so as to be driven by the vehicle engine.

To achieve the conversion it has been common to extend the front wheel axles into and through the wheel hubs to the outboard side of the wheel whereat a clutch ring is axially moved between engagement with one of the axle and wheel hub and, alternatively, engagement with both. A more recent improvement to the conversion process is the reconfiguration of the wheel hub to provide a mounting for the wheel hub to the vehicle frame or suspension that exposes a hub portion inboard of the wheel and adjacent an axle portion, e.g., at the CV joint. A clutch ring and actuator at this inboard end provide the desired engagement/disengagement of the wheel hub and drive axle. See the commonly owned U.S. Pat. No. 5,740,895.

A further consideration to the mounting arrangement is the bearings that provide rotation as between the vehicle frame (suspension) and the wheel hub. These bearings are placed under axial compression and locked to prevent undesired operating clearances. This axial compression and locking is desirably provided at the internal end, i.e., whereat the clutch ring engagement is provided. Prior designs for achieving both have involved the provision of a coupler that is rotatably fixed to the inboard end of the wheel hub adjacent the support bearings, and in cooperation with the coupler, a lock mechanism providing both axial compression and locked engagement of the coupler against the bearing. The coupler includes external splines adjacent and matched to splines on the axle which are selectively engaged by a clutch ring to thereby engage and disengage the axle from the wheel hub.

BRIEF DESCRIPTION OF THE INVENTION

It is an objective of the present invention to separate the features of clutch ring engagement and bearing compression while simplifying the manner of clutch ring actuation.

In a preferred embodiment, the wheel bearings are mounted to the outer diameter of an inwardly extended portion of the wheel hub (sometimes referred to as the spindle portion of the wheel hub) and the inboard end of the spindle portion is turned or roll formed directly against the inner race of the bearings to apply both the desired compression and lock the bearings in the compressed condition.

The wheel hub is cylindrical and the inner diameter of the spindle portion, intermediate the ends, is fitted with bearings that provide rotatable support for the axle. The inner diameter at the extreme inboard end of the spindle portion is configured to have a spaced apart relation with the axle and the spaced apart interfaces of the spindle portion and axle are provided with splines. A clutch ring resides in the spacing and is axially slidable (via an actuator) relative to the splines to produce the desired engagement and disengagement as between the spindle portion of the wheel hub and axle. It is to be noted that the bearing retention is provided at the exterior wall of the cylindrical spindle portion and the clutch ring engagement is independently provided at the interior wall.

The invention will be more fully appreciated upon reference to the following detailed description having reference to the accompanying drawings.

DETAILED DESCRIPTION OF THE PREFERRED EMBODIMENT

Figure 1:
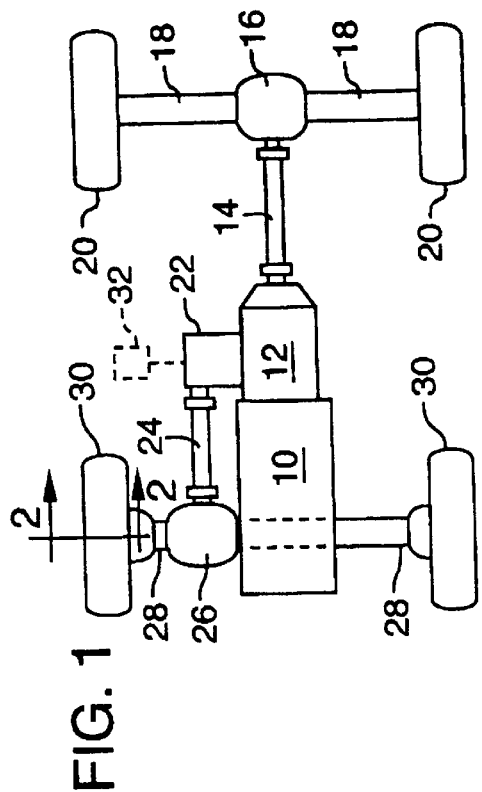
FIG. 1 schematically illustrates a vehicle chassis convertible between two-wheel and four-wheel drive.

With reference to FIG. 1, illustrated is a chassis including an engine 10 connected to a transmission 12, connected to a rear propellor shaft 14 connected to a rear differential 16 connected to rear axles 18 which drive rear wheels 20.

Also connected to the transmission 12 is a transfer case 22 connected to a front propellor shaft 24 connected to a front differential 26 for driving front axles 28 and front wheels 30. A control represented by dash line box 32 is connected to the transfer case 22 for engaging/disengaging the front propellor shaft from the transfer case and thus the engine 10.

It will be understood that with the front propellor shaft connected to the transmission via control 32, the front wheels are driven by the engine for four-wheel drive. When the propellor shaft 24 and only the propellor shaft is disconnected from the transmission 12, the wheels 30 are nevertheless driven through engagement with the road surface. The axles 28, differential 26 and propellor shaft 24 are then driven by the rotation of the wheels 30. This unnecessary wear of the drive components and loss of power consumption is preferably avoided by providing a secondary disconnect at the wheel hub of the wheels 30. The wheel hub of the right front wheel hub is illustrated in FIG. 2 as indicated by view lines 2—2 in FIG. 1.

Figure 2:
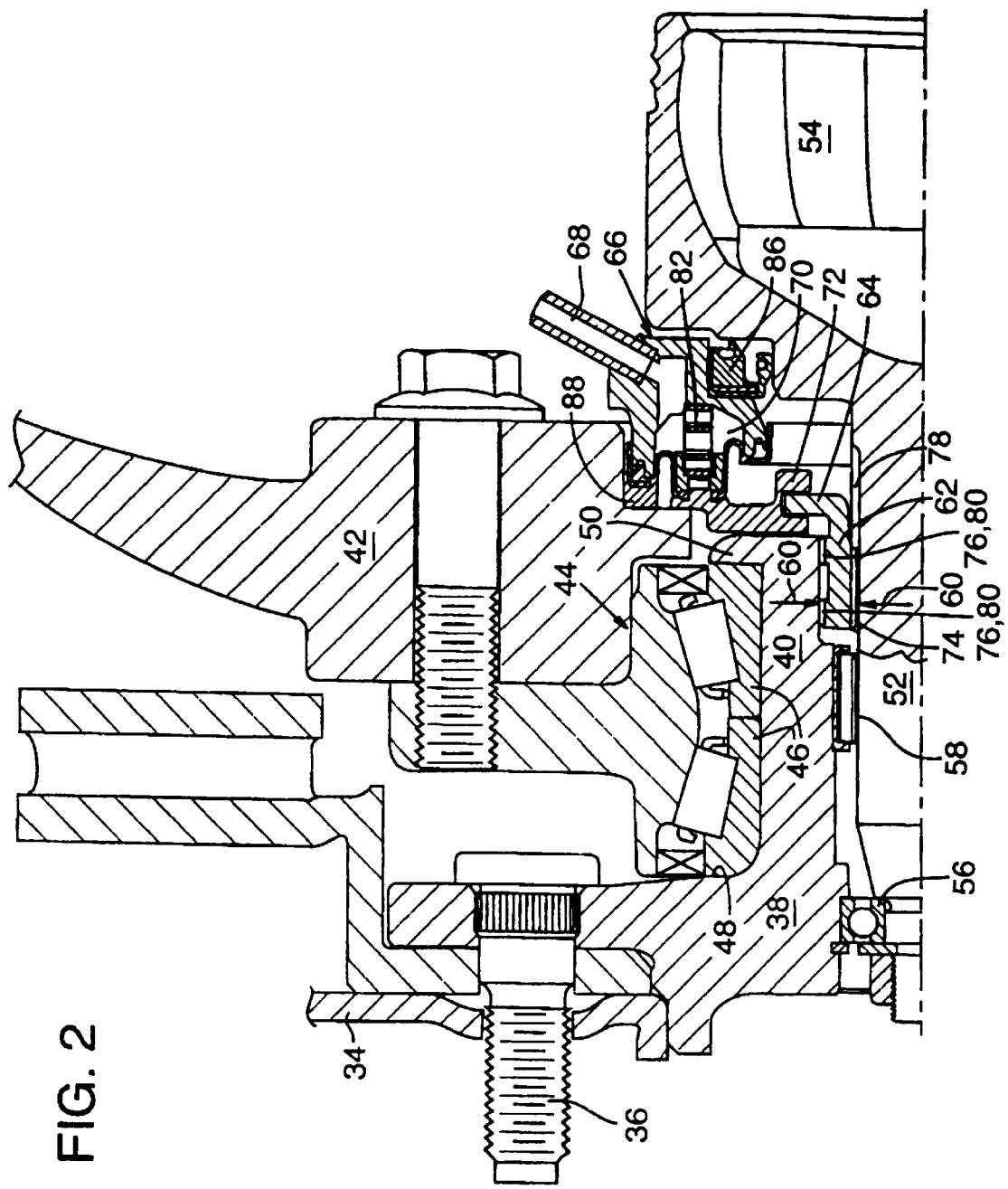
FIG. 2 is a section view of a wheel end illustrating a preferred embodiment of the present invention wherein the clutch ring is shown in the position of engagement.

Reference is now made to FIG. 2. In FIG. 2, item 34 is a section of the wheel rim by which the wheel 30 (not shown in FIG. 2) is mounted, i.e., bolted (bolts or studs 36) to the wheel hub 38. As shown, the wheel hub 38 is provided with a cylindrical inboard segment 40 sometimes referred to as a spindle portion or spindle. The spindle is mounted to a vehicle knuckle 42 via a bearing pack 44 including an inner race 46. The inner race is abutted at its outboard end against a shoulder 48 of the wheel hub and the extreme inboard end 50 of the spindle portion 40 is roll formed and controllably pressed against the inboard end of inner race 46 to provide the desired compressive retention of the bearing pack 44.

An axle portion 52 extended from CV joint 54 extends into the wheel hub 38 to be supported therein by bearings 56, 58. The configuration of axle 52 and the spindle portion 40 at the inward end thereof provides a cylindrical space represented by arrows 60. Fitted into the space 60 is a clutch ring 62 including an inboard flange 64 protruded from the spindle end 40.

A pneumatic actuator 66 is mounted to the knuckle 42 and controlled via air line 68 to expand and contract an annular chamber 70 for axial movement of fork 72. Fork 72 and actuator 66 are rotatably fixed via its mounting to the knuckle 42. The fork 72 is configured so as to engage flange 64 of clutch ring 62 for axial movement of the flange but providing a bearing relationship for relative rotation (in a manner well known to the art) to permit rotation of the clutch ring 62 with axle 52 and spindle 40. As will be explained, the axial movement of the clutch ring provides the desired engagement/disengagement as between the wheel hub 38 (and thus the wheel 30), with the CV joint 54 (and thus axle 28).

Figure 4:
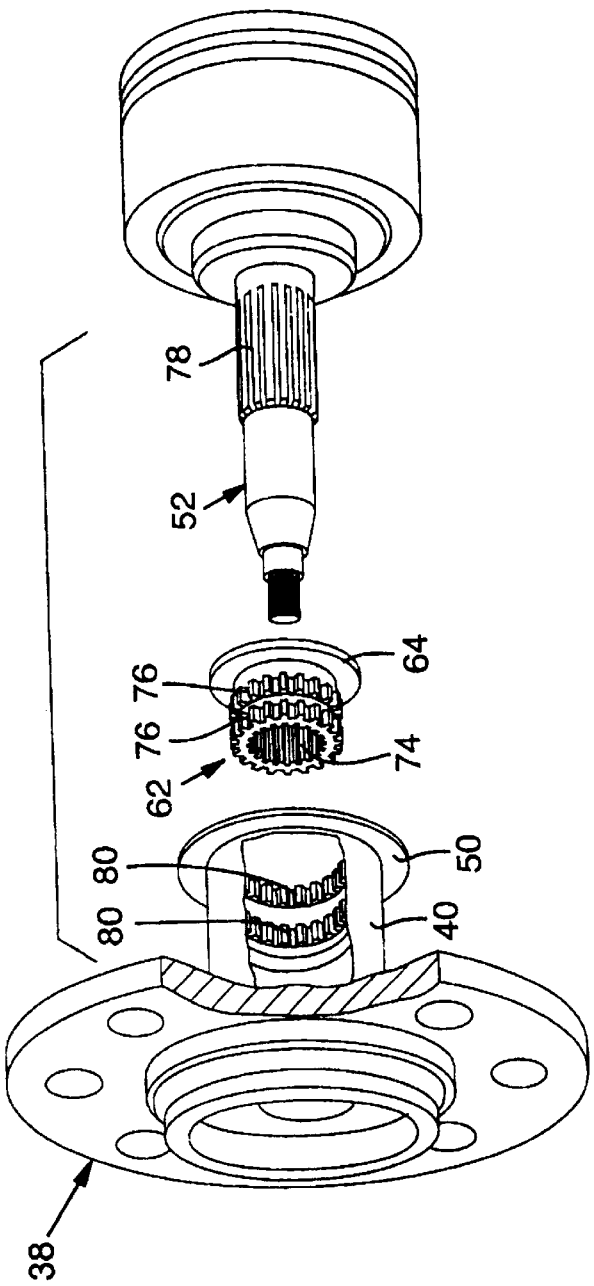
FIG. 4 illustrates the engagement components in exploded view.

As noted in FIG. 4 (but also referring to FIG. 2), the clutch ring 62 is provided with an inner diameter having splines 74 that are continuous, and an outer diameter having splines 76 that are axially spaced spline segments. Axle 52 is provided with splines 78 that mesh with splines 74 of clutch ring 62 to provide permanent engagement rotatively but permitting axial sliding movement. The spindle portion 40 is provided with spaced spline segments 80 that are matched to the spline segments 76 of the clutch ring 62. In the axial position of the clutch ring shown in FIG. 2, the spline segments 76 (of clutch ring 62) and spline segments 80 (of spindle portion 40) are in overlapping relation and force common rotation as between the clutch ring and spindle. Because splines 74 of the clutch ring and splines 78 of the axle are permanently engaged rotatively, the axle and wheel portion are engaged rotatively.

Figure 3:
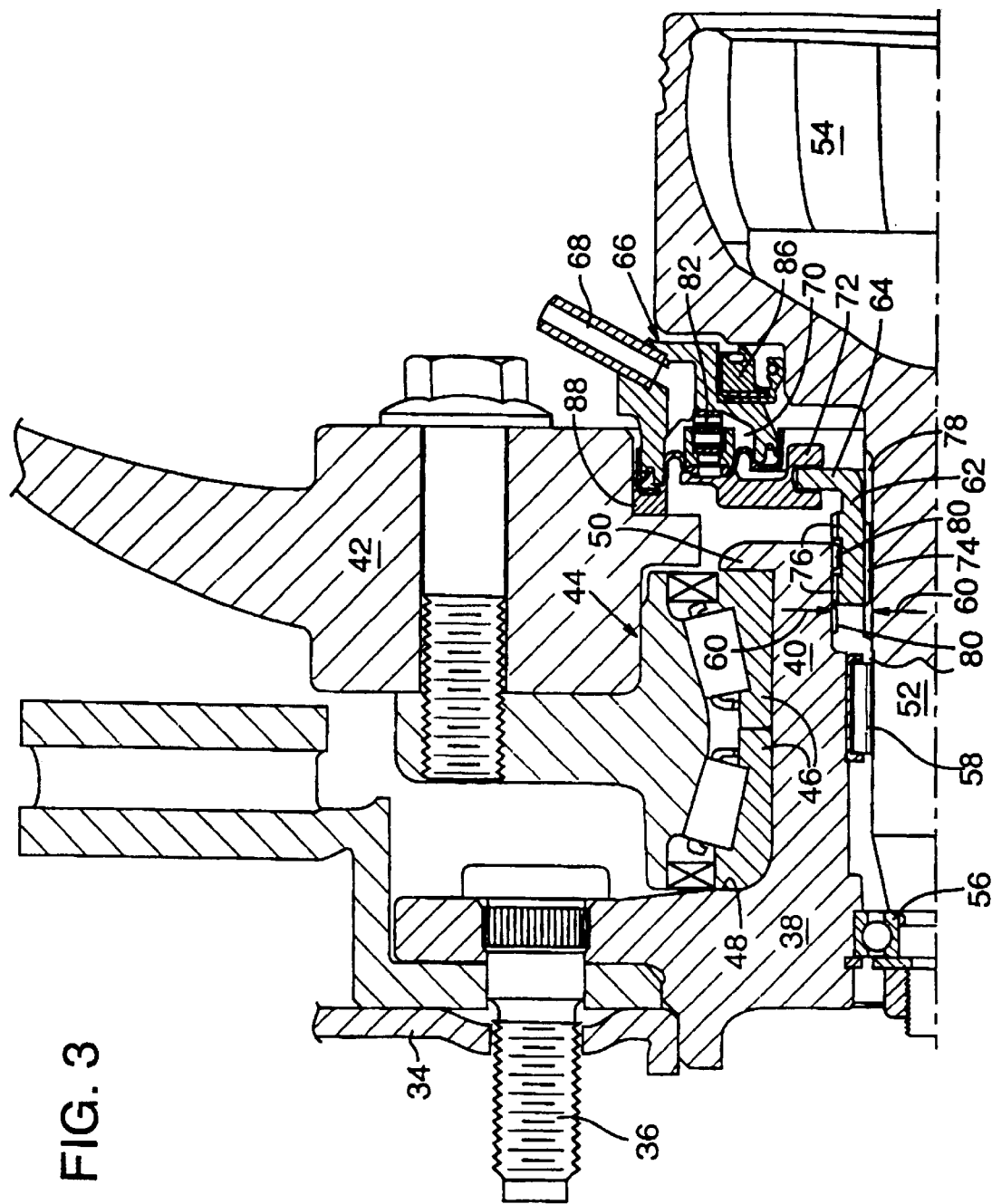
FIG. 3 is a view of that portion of FIG. 2 illustrating the components of engagement but showing the clutch ring in the position of disengagement.

In FIG. 3, the clutch ring has been axially shifted whereat the splines 76 of the clutch ring are positioned axially in between the spline segments 80 of the spindle portion 40 to thereby permit relative rotation as between the clutch ring and spindle and thus permit relative rotation as between the wheel hub and axle.

In operation, the annular air chamber 70 of the actuator 66 is expanded or contracted through an air pressure differential directed through line 68, e.g., a negative differential from the intake manifold. An annular actuator of the type herein contemplated is illustrated in the afore mentioned U.S. Pat. No. 5,740,895 and in greater detail in commonly owned application for patent Ser. No. 09/310,887. With expansion of the air chamber 70 (urged by spring 82) as indicated in FIG. 2, the fork 72 is moved outboard and similarly moves clutch ring 62 outboard to achieve meshing of spline segments 76, 80. With contraction of the air chamber 70 (via negative pressure differential), the spring 82 is compressed and the fork 72 is moved inboard and moves clutch ring 62 inboard to intersperse the spline segments 76, 80 as illustrated in FIG. 3.

It will be appreciated that the compression of the inner race 46 is achieved directly by the out turned (roll formed) end 50 of the spindle. Such compression can be achieved by other means, however, e.g., a nut and nut lock device. It will also be appreciated that a coupler is not required as is typical in prior devices and instead the clutch ring acts directly between the spindle and the axle at the inner diameter of the spindle. Fewer parts and a more compact package of the actuator and clutch ring Is achieved. The package is sealed against contaminants by the seats 86 and 88 as shown in FIG. 2. Numerous variations will be suggested to those skilled in the art without departing from the invention. The invention is to be determined from the appended claims and specifically 35 USC §112 ¶6 is not intended for any of the claims.

The invention claimed is:

1. A wheel end assembly for converting a vehicle between four-wheel and two-wheel drive comprising:
   a wheel hub having an outboard end and an inboard end, said wheel hub configured to support a vehicle wheel at the outboard end and having an intermediate exterior portion whereat the wheel hub is supported on a vehicle frame, said intermediate portion having an outboard shoulder, a support bearing having its outboard end abutted against the shoulder, and a securement member in abutted engagement with the inboard end of the support bearing for securing the bearing to the wheel hub, and the support bearing supporting the wheel hub rotatively on the vehicle frame;
   an opening formed in the inboard end of the wheel hub and defining an inner wall, an axle portion extended into the opening and rotatively supported by the inner wall and as supported by the inner wall defining an annular space between the axle and the wheel hub at the inboard end of the wheel hub, said inner wall of the wheel hub at said annular space configured to have splines, and an adjacent exterior wall of the axle configured to have splines, and a clutch ring having exterior and interior splines and slidably mounted within said annular space and movable between a first position of splined engagement with the splines of one only of said axle and wheel hub and into a second position of splined engagement with the splines of both said axle and wheel hub, and an actuator moving the clutch ring between the two positions of engagement.

2. A wheel end assembly as defined in claim 1 wherein the clutch ring protrudes from the inboard end of the wheel hub to form a radial flange and said actuator being fixed rotatively and including a fork that engages the flange to move the flange and clutch ring axially and said fork configured to permit relative rotation as between the clutch ring and actuator.

3. A wheel end assembly as defined in claim 2 wherein the actuator is a pneumatic actuator secured to the vehicle frame, said pneumatic actuator including an air chamber and an air line for selectively generating below ambient air pressure and ambient air pressure in the air chamber and upon deflating the air chamber, for moving the fork and clutch ring to one position, and a resilient member in the air chamber urging the air chamber to an expanded position for moving the fork and clutch ring to the other position upon the air chamber being returned to ambient air pressure.

4. A wheel end assembly as defined in claim 1 wherein the splines of one of the wheel hub and axle are spline segments axially spaced apart and the corresponding splines of the clutch ring are mated spline segments axially spaced apart, said spline segments and mated spline segments in interspersed relation and non-engagement in the first position and in overlapping relation to achieve splined engagement in the second position.

5. A wheel end assembly as defined in claim 1 wherein the securement member is a roll formed inboard end of the wheel hub roll formed into compressive and retentive engagement with the inboard end of the support bearing.

6. A wheel end assembly for a vehicle comprising:
   a vehicle frame having an opening defining an annular support surface;
   a wheel hub including a hub portion supporting a wheel and an inwardly directed spindle portion extended into and rotatably supported by said annular support surface and defining an inboard end;

said spindle portion having an internal cylindrical cavity open to said inboard end and an axle portion extended into the cavity from the inboard end and rotatably supported within said cavity at a position spaced from said inboard end;

said axle portion as extended into said cavity and said inboard end of said cavity cooperatively defining a space at the interface between said axle portion and said spindle portion, a clutch ring projected into the space and having an external surface area in splined engagement with the spindle portion and an internal surface in splined engagement with the axle portion whereby the axle portion and spindle portion are interengaged, and said clutch ring axially slidable out of engagement with one of said spindle portion and said axle portion whereby the spindle portion and the axle portion are disengaged;

an actuator mounted to said frame portion and connected to said clutch ring, said actuator producing axial sliding of said clutch ring and thereby selective engagement and disengagement of said spindle portion relative to said axle portion.

7. A wheel end assembly as defined in claim 6 wherein said clutch ring includes a flange portion protruded from the inboard end of the spindle portion, said actuator including an actuator fork in engagement with said flange portion for effecting said axial sliding of said clutch ring.

* * * * *